(12) United States Patent
Wei et al.

(10) Patent No.: US 12,524,299 B2
(45) Date of Patent: Jan. 13, 2026

(54) PARITY BLOCK GENERATION METHOD AND APPARATUS

(71) Applicant: HANGZHOU ALICLOUD FEITIAN INFORMATION TECHNOLOGY CO., LTD., Hangzhou (CN)

(72) Inventors: Shuzhan Wei, Hangzhou (CN); Junqing Gu, Hangzhou (CN); Yafei Zhao, Hangzhou (CN); Yuanyuan Dong, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 21 days.

(21) Appl. No.: 18/685,193

(22) PCT Filed: Sep. 30, 2022

(86) PCT No.: PCT/CN2022/123497
§ 371 (c)(1),
(2) Date: Feb. 20, 2024

(87) PCT Pub. No.: WO2023/056904
PCT Pub. Date: Apr. 13, 2023

(65) Prior Publication Data
US 2024/0345917 A1    Oct. 17, 2024

(30) Foreign Application Priority Data

Oct. 9, 2021 (CN) .......................... 202111176152.3

(51) Int. Cl.
*G06F 11/10* (2006.01)
*G06F 11/14* (2006.01)

(52) U.S. Cl.
CPC ...... *G06F 11/1004* (2013.01); *G06F 11/1458* (2013.01)

(58) Field of Classification Search
CPC .......................... G06F 11/1004; G06F 11/1458
(Continued)

(56) References Cited

U.S. PATENT DOCUMENTS

| 11,031,954 B1* | 6/2021 | Chang ................ H03M 13/1182 |
| 2013/0232390 A1* | 9/2013 | Zhang ................ H03M 13/1111 |
| | | 714/755 |

(Continued)

FOREIGN PATENT DOCUMENTS

| CN | 107656832 A | 2/2018 |
| CN | 107844272 A | 3/2018 |

(Continued)

OTHER PUBLICATIONS

International Search Report in PCT/CN2022/123497, mailed Dec. 15, 2022, 3 pages.

*Primary Examiner* — James C Kerveros
(74) *Attorney, Agent, or Firm* — Armstrong Teasdale LLP

(57) ABSTRACT

A parity block generation method and apparatus are disclosed. The method comprises: for a plurality of original data blocks for which parity blocks are to be generated, determining a global coding matrix for the plurality of original data blocks; for each local domain that is obtained by dividing the plurality of original data blocks, determining a local coding matrix of the local domain on the basis of the global coding matrix, wherein each local domain comprises original data blocks that belong to the local domain; and generating, on the basis of the global coding matrix, global parity blocks for the plurality of original data blocks, and generating, on the basis of the local coding matrix of each local domain, a local reconstruction parity block of each local domain, such that the global parity blocks have a derivation relationship with the local reconstruction parity block of each local domain.

15 Claims, 2 Drawing Sheets

(58) Field of Classification Search
USPC .......................................................... 714/807
See application file for complete search history.

(56) References Cited

U.S. PATENT DOCUMENTS

| | | | |
|---|---|---|---|
| 2019/0319638 A1* | 10/2019 | Chang | H03M 13/1171 |
| 2020/0127684 A1* | 4/2020 | Park | H03M 13/2942 |
| 2024/0097709 A1* | 3/2024 | Hyun | H03M 13/17 |

FOREIGN PATENT DOCUMENTS

| | | |
|---|---|---|
| CN | 111149093 A | 5/2020 |
| CN | 114048061 A | 2/2022 |

* cited by examiner

PARITY BLOCK GENERATION METHOD AND APPARATUS

The present application is the 35 U.S.C. § 371 U.S. National Phase of International Patent Application No. PCT/CN2022/123497, filed Sep. 30, 2022, which claims priority to Chinese patent application No. 202111176152.3, filed with the China Patent Office on Oct. 9, 2021 and entitled "PARITY BLOCK GENERATION METHOD AND APPARATUS", the disclosures of which are incorporated herein by reference in their entireties.

TECHNICAL FIELD

One or more embodiments of this specification relates to the technical field of data storage, and especially to a parity block generation method and apparatus.

BACKGROUND

With the development of technology and the increase in demand, the scale of data storage is expanding day by day. Most of current data storage solutions are implemented by combining a distributed system with high scalability. In the distributed system, data is stored in the form of data blocks, with one file being broken down into a plurality of data blocks that are stored in different disks or storage nodes respectively.

In order to guarantee data recoverability, in the distributed system, parity blocks typically may be set for original data blocks, and the parity blocks may be classified into a global parity block and a local reconstruction parity block. In a case that part of the original data blocks are lost, the lost original data blocks can be recovered on the basis of unlost original data blocks and the parity blocks; while in a case that the parity blocks are lost, the lost parity blocks can also be reproduced on the basis of the original data blocks. In related technologies, the recovery of the lost parity blocks consumes a significant amount of traffic and time for acquiring the original data blocks, which reduces the data recovery efficiency.

SUMMARY

In light of this, one or more embodiments of this specification provide a parity block generation method and apparatus.

To achieve the above objectives, one or more embodiments of this specification provide the following technical solutions.

According to a first aspect of one or more embodiments of this specification, there is provided a parity block generation method, comprising: for a plurality of original data blocks for which parity blocks are to be generated, determining a global coding matrix for the plurality of original data blocks; for each local domain that is obtained by dividing the plurality of original data blocks, determining a local coding matrix of the local domain on the basis of the global coding matrix, wherein each local domain comprises original data blocks that belong to the local domain; and generating, on the basis of the global coding matrix, global parity blocks for the plurality of original data blocks, and generating, on the basis of the local coding matrix of each local domain, a local reconstruction parity block of each local domain, such that the global parity blocks have a derivation relationship with the local reconstruction parity block of each local domain.

According to a second aspect of one or more embodiments of this specification, there is provided a parity block generation apparatus, comprising a global matrix determination unit, a local matrix determination unit, and a parity block generation unit, wherein the global matrix determination unit determines, for a plurality of original data blocks for which parity blocks are to be generated, a global coding matrix for the plurality of original data blocks; the local matrix determination unit determines, for each local domain that is obtained by dividing the plurality of original data blocks, a local coding matrix of the local domain on the basis of the global coding matrix, each local domain comprises original data blocks that belong to the local domain; and the parity block generation unit generates, on the basis of the global coding matrix, global parity blocks for the plurality of original data blocks, and generates, on the basis of the local coding matrix of each local domain, a local reconstruction parity block of each local domain, such that the global parity blocks have a derivation relationship with the local reconstruction parity block of each local domain.

According to a third aspect of one or more embodiments of this specification, there is provided an electronic device, comprising a processor and a memory for storing processor-executable instructions; wherein the processor implements the steps in the method as described above in the first aspect by running the executable instructions.

According to a fourth aspect of one or more embodiments of this specification, there is provided a computer-readable storage medium storing a computer program therein, wherein the computer program, when executed by a processor, implements the steps in the method as described above in the first aspect.

The above summary is for the purpose of illustration only and is not intended to make limitations in any way. In addition to the schematic aspects, implementations and features described above, further aspects, implementations and features of the present application will be readily understood with reference to the drawings and the following detailed description.

DETAILED DESCRIPTION

Figure 1:
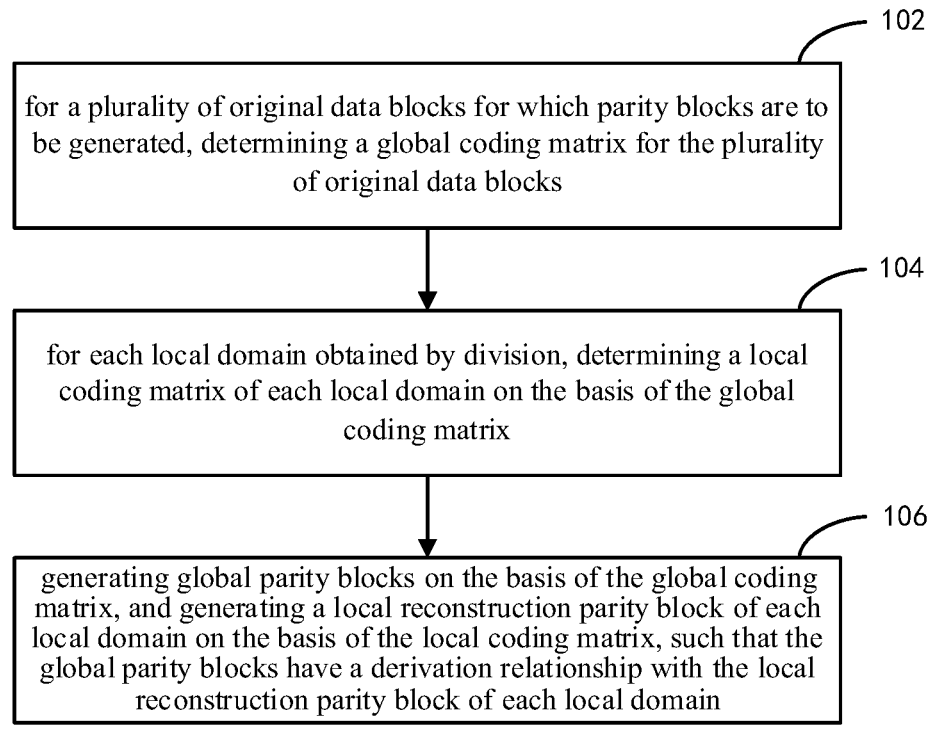
FIG. 1 is a schematic flow chart of a parity block generation method provided in an exemplary embodiment.

Exemplary embodiments will be explained here in a detailed manner, examples of which are illustrated in the drawings. When the following description refers to the drawings, the same numerals in different drawings denote the same or similar elements, unless otherwise indicated. The implementations described in the following exemplary embodiments do not represent all implementations consistent with one or more embodiments of this specification. Conversely, they are merely examples of apparatuses and methods consistent with some aspects of one or more embodiments of this specification as detailed in the appended claims.

It should be noted that in other embodiments, steps of a corresponding method are not definitely executed in an order shown and described in this specification. Methods in some other embodiments may comprise more or fewer steps than described in this specification. In addition, a single step described in this specification may be broken down into a plurality of steps for description in other embodiments; and a plurality of steps described in this specification may also be combined into a single step in other embodiments for description.

With the development of technology and the increase in demand, the scale of data storage is expanding day by day. Most of current data storage solutions are implemented on the basis of a distributed system with high scalability. In the distributed system, data is stored in the form of data blocks, with one file or all data required for storage by one storage request being broken down into a plurality of data blocks that are stored in different disks or storage nodes respectively.

In order to guarantee data recoverability, when the distributed system performs data storage in data blocks, it typically sets parity blocks for data recovery in conjunction with coding means of erasure code on the basis of the original data blocks. The parity blocks typically may be classified into a global parity block and a local reconstruction parity block, wherein on the basis of all of a plurality of original data blocks for which parity blocks are to be generated, a global parity block for the plurality of original data blocks may be generated; and after the plurality of original data blocks are divided to different local domains respectively, a local reconstruction parity block of each local domain may be generated respectively for the original data blocks in each local domain.

In a case that part of the original data blocks are lost, the lost original data blocks can be recovered on the basis of unlost original data blocks and the parity blocks; while in a case that the parity blocks are lost, the lost parity blocks can also be reproduced on the basis of the original data blocks.

To give an example, assuming that there exist 6 original data blocks $D_1$, $D_2$, $D_3$, $D_4$, $D_5$ and $D_6$ for which parity blocks are to be generated, they are divided to two local domains respectively, with a local domain $F_1$ including original data blocks $D_1$, $D_2$ and $D_3$, and a local domain $F_2$ including original data blocks $D_4$, $D_5$ and $D_6$. For the 6 original data blocks $D_1$, $D_2$, $D_3$, $D_4$, $D_5$ and $D_6$, a global parity block $P_1$ may be generated, namely $P_1=D_1+2D_2+3D_3+4D_4+5D_5+6D_6$. For original data blocks $D_1$, $D_2$ and $D_3$ in local domain $F_1$, a local reconstruction parity block $L_1$ of local domain $F_1$ may be generated, namely $L_1=D_1+D_2+D_3$. For original data blocks $D_4$, $D_5$ and $D_6$ in local domain $F_2$, a local reconstruction parity block $L_2$ of local domain $F_2$ may be generated, namely $L_2=D_4+D_5+D_6$. The "+" operation here and hereinafter may be implemented by employing XOR operation.

In a case that original data block $D_1$ is lost, the lost original data block $D_1$ may be recovered on the basis of remaining unlost original data blocks $D_2$ and $D_3$ in local domain $F_1$ to which it belongs and local reconstruction parity block $L_1$ of local domain $F_1$, namely $D_1=L_1-(D_2+D_3)$. Alternatively, the lost original data block $D_1$ may also be recovered on the basis of other unlost original data blocks $D_2$, $D_3$, $D_4$, $D_5$ and $D_6$ and global parity block $P_1$, namely $D_1=P_1-(2D_2+3D_3+4D_4+5D_5+6D_6)$. The "−" operation here and hereinafter may be implemented based on XOR operation.

Furthermore, in a case that global parity block $P_1$ is lost, the lost global parity block $P_1$ may be reproduced on the basis of all original data blocks $D_1$, $D_2$, $D_3$, $D_4$, $D_5$ and $D_6$, namely $P_1=D_1+D_2+D_3+D_4+D_5+D_6$. In a case that local reconstruction parity block $L_1$ is lost, the lost local reconstruction parity block $L_1$ may be reproduced on the basis of original data blocks $D_1$, $D_2$ and $D_3$ in local domain $F_1$, namely $L_1=D_1+D_2+D_3$.

As can be seen, in related technologies, in a case that a parity block is lost, original data blocks need to be acquired for recovering the lost parity block. The greater the number of the original data blocks, the more the traffic and time consumed for recovering the parity block, thereby causing a problem of reduced data recovery efficiency.

In view of this, this specification provides a parity block generation method, which determines, on the basis of a global coding matrix employed in generating a global parity block, a local coding matrix for generating each local reconstruction parity block, such that the global parity block has a derivation relationship with each local reconstruction parity block, thereby being able to reduce acquisition of the original data blocks when recovering a parity block, lower the traffic and time consumption, and improve the data recovery efficiency.

Please refer to FIG. 1, which is a schematic flow chart of a parity block generation method provided in an exemplary embodiment.

The parity block generation method shown in FIG. 1 may be applied to any node device in a distributed system that provides data storage services.

The parity block generation method may comprise the following specific steps:

Step 102: for a plurality of original data blocks for which parity blocks are to be generated, determining a global coding matrix for the plurality of original data blocks.

In a distributed system, data is stored in the form of data blocks. One file to be stored or all data required for storage by one storage request of a user is broken down into a plurality of original data blocks to be stored, and the plurality of original data blocks obtained through breakdown may be stored in different node devices in the distributed system, or in different disks of one and the same node device, thereby avoiding the file or the data required for storage by the storage request being entirely lost due to a failure of a certain node device or a certain disk.

In order to achieve data recovery, for a plurality of original data blocks for which parity blocks are to be generated, any node device in the distributed system may first determine a global coding matrix for the plurality of original data blocks to generate, on the basis of the global coding matrix, a global parity block for the plurality of original data blocks. The any node device may be one of node devices that stores the original data blocks, or may be a node device used for generating parity blocks in the distributed system.

The global coding matrix employs a preset matrix format, which is determined on the basis of the number of original data blocks for which parity blocks are to be generated and the number of global parity blocks set in advance. There are a variety of implementation formats for the matrix format of the global coding matrix, and the number of original data blocks for which parity blocks are to be generated and the number of global parity blocks required to be generated may be set according to actual application scenarios. This specification makes no specific limitations in this regard.

Taking generation of m global parity blocks $P_1, P_2, \ldots, P_m$ for k original data blocks $D_1, D_2, \ldots, D_k$ as an example, where k and m are both positive integers, a global coding matrix is preset to be determined employing the format of a Vandermonde matrix, and is shown in Formula (1):

$$\begin{bmatrix} 1 & a_1^1 & a_1^2 & \ldots & a_1^{k-1} \\ 1 & a_2^1 & a_2^2 & \ldots & a_2^{k-1} \\ \ldots & \ldots & \ldots & & \\ 1 & a_m^1 & a_m^2 & \ldots & a_m^{k-1} \end{bmatrix} \quad \text{Formula (1)}$$

where the global coding matrix is composed of m global coding vectors, an i-th global coding vector is composed of k global coding parameters $A_{ij}=a_i^{j-1}$ (i=1, 2, ..., m; j=1, 2, ..., k) in one-to-one correspondence with original data blocks $D_j$, and parameter $A_{ij}$ is a positive integer.

It should be noted that although there are a variety of optional matrix formats for the global coding matrix, in order to realize a coding requirement that an erasure code still can recover lost original data blocks for k original data blocks and m global parity blocks in a case that the number of the lost original data blocks does not exceed m, any global coding vector in the global coding matrix should compose an invertible matrix with any vector in an identity matrix, the order of the identity matrix is consistent with the number of the original data blocks, and the format of the above Vandermonde matrix is one of the matrix formats that can meet this coding requirement.

Step 104: for each local domain that is obtained by dividing the plurality of original data blocks, determining a local coding matrix of the local domain on the basis of the global coding matrix, wherein each local domain comprises original data blocks that belong to the local domain.

The plurality of original data blocks for which parity blocks are to be generated are divided to a plurality of local domains, each local domain comprising original data blocks that belong to the local domain, and generation of a local reconstruction parity block is performed for each local domain. To divide the local domains, there are a variety of implementations. The number of divided local domains may be set in advance, or may vary depending on the number of original data blocks for which parity blocks are to be generated. In each local domain, the number of original data blocks included may be consistent or not. Original data blocks included in each local domain may be consecutive data blocks in an original file or storage request, or may be random and non-consecutive data blocks. This specification makes no specific limitations in this regard.

In an example, it is possible to set in advance the number of original data blocks included in each local domain, determine the number of divided local domains on the basis the number of original data blocks for which parity blocks are to be generated, and then after determining the number of local domains and the number of original data blocks included in each local domain, divide the plurality of original data blocks to respective local domains according to their consecutive order during breakdown. For example, for original data blocks $D_1, D_2, D_3, D_4, D_5$ and $D_6$ for which parity blocks are to be generated, the number of original data blocks included in each local domain is set in advance to 3, it is determined that there will be 2 local domains, and then original data blocks $D_1, D_2$ and $D_3$ obtained consecutively during breakdown are divided to local domain $F_1$, and original data blocks $D_4, D_5$ and $D_6$ are divided to local domain $F_2$.

After division of the local domains is completed, each local domain and original data blocks included therein may be determined. For each local domain, a local coding matrix of the local domain is determined on the basis of the global coding matrix as determined at step 102, such that a local reconstruction parity block generated on the basis of the local coding matrix of each local domain has a derivation relationship with the global parity block generated on the basis of the global coding matrix.

Based on the foregoing, the global coding matrix comprises one or more global coding vectors, each global coding vector comprising global coding parameters in one-to-one correspondence with respective original data blocks. Taking generation of m global parity blocks $P_1, P_2, \ldots, P_m$ for k original data blocks $D_1, D_2, \ldots, D_k$ as an example, a global coding matrix comprises m global coding vectors, and an i-th global coding vector comprises k global coding parameters $A_{ij}$ (i=1, 2, ..., m; j=1, 2, ..., k) in one-to-one correspondence with original data blocks $D_j$. Taking the global coding matrix shown in Formula (1) as an example, the i-th global coding vector is shown in Formula (2):

$$[ 1 \quad a_i^1 \quad a_i^2 \quad \ldots \quad a_i^{k-1} ] \quad \text{Formula (2)}$$

It is assumed that n local domains are obtained by division. For each local domain $F_q$ (q=1, 2, ..., n), on the basis of the global coding parameters $A_{ij}$ in the global coding matrix, it is possible to determine local coding parameters $B_{qr}$ (r=1, 2, ..., $r_{max}$) in a local coding matrix of the local domain $F_q$, with $r_{max}$ being consistent with the number of original data blocks included in the local domain. The local coding matrix of the local domain $F_q$ as composed of the local coding parameters $B_{qr}$ is shown in Formula (3):

$$[ B_{q1} \quad B_{q2} \quad B_{q3} \quad \ldots \quad B_{qr_{max}} ] \quad \text{Formula (3)}$$

To determine the local coding matrix of the local domain on the basis of the global coding matrix, there are a variety of optional implementations. This specification makes no specific limitations in this regard. It can be understood that the logic of determining the local coding matrix of each local domain on the basis of the global coding matrix affects a derivation relationship between the global parity block and the local reconstruction parity block of each local domain.

Step 106: generating, on the basis of the global coding matrix, global parity blocks for the plurality of original data blocks, and generating, on the basis of the local coding matrix of each local domain, a local reconstruction parity block of each local domain, such that the global parity blocks have a derivation relationship with the local reconstruction parity block of each local domain.

After determining the global coding matrix and the local coding matrix of each local domain, it is possible to generate a global parity block for the plurality of original data blocks on the basis of the global coding matrix, wherein the i-th global coding vector in the global coding matrix correspondingly generates an i-th global parity block $P_i$. It is possible to generate a local reconstruction parity block of each local domain on the basis of the local coding matrix of each local domain, wherein on the basis of the local coding matrix of an q-th local domain $F_q$, a local reconstruction parity block $L_q$ of the local domain $F_q$ is correspondingly generated.

In an example, based on the global coding matrix shown in Formula (1), the m global parity blocks $P_1, P_2, \ldots, P_m$ for the k original data blocks $D_1, D_2, \ldots, D_k$ are generated, as shown in Formula (4):

$$\begin{bmatrix} 1 & a_1^1 & a_1^2 & \ldots & a_1^{k-1} \\ 1 & a_2^1 & a_2^2 & \ldots & a_2^{k-1} \\ \ldots & \ldots & \ldots & & \\ 1 & a_m^1 & a_m^2 & \ldots & a_m^{k-1} \end{bmatrix} * \begin{bmatrix} D_1 \\ D_2 \\ \vdots \\ D_{k-1} \\ D_k \end{bmatrix} = \begin{bmatrix} P_1 \\ P_2 \\ \vdots \\ P_{m-1} \\ P_m \end{bmatrix} \quad \text{Formula (4)}$$

where the global parity block $P_i = D_1 + a_i^1 * D_2 + a_i^2 * D_3 + \ldots + a_i^{k-1} * D_k$.

The global parity block may be used for recovering lost original data blocks. When the number of lost original data blocks among the k original data blocks does not exceed m, assuming that original data blocks $D_1$ and $D_2$ are lost, the means of recovering the lost original data blocks $D_1$ and $D_2$ is shown in Formula (5):

$$\begin{bmatrix} D_1 \\ D_2 \\ \vdots \\ D_{k-1} \\ D_k \end{bmatrix} = \begin{bmatrix} D_1 \\ D_2 \\ \vdots \\ D_{k-1} \\ D_k \end{bmatrix} = \begin{bmatrix} 0 & 0 & 1 & \ldots & 0 \\ \ldots & \ldots & \ldots & & \\ 0 & 0 & 0 & \ldots & 1 \\ 1 & a_1^1 & a_1^2 & \ldots & a_1^{k-1} \\ 1 & a_2^1 & a_2^2 & \ldots & a_2^{k-1} \\ \ldots & \ldots & \ldots & & \\ 1 & a_m^1 & a_m^2 & \ldots & a_m^{k-1} \end{bmatrix}^{-1} * \begin{bmatrix} D_3 \\ \vdots \\ D_{k-1} \\ D_k \\ P_1 \\ P_2 \\ \vdots \\ P_{m-1} \\ P_m \end{bmatrix}$$

Formula (5)

(with intermediate step shown involving the same inverse matrix multiplied by the coding matrix yielding identity.)

For one local domain $F_1$ comprising original data blocks $D_1$, $D_2$, and $D_3$, a local coding matrix of the local domain $F_1$ is shown in Formula (6):

$$[B_{11} \ B_{12} \ B_{13}] \quad \text{Formula (6)}$$

On the basis of the local coding matrix of the local domain $F_1$ shown in Formula (6), a local reconstruction parity block $L_1$ of the local domain $F_1$ is generated, as shown in Formula (7):

$$[B_{11} \ B_{12} \ B_{13}] * \begin{bmatrix} D_1 \\ D_2 \\ D_3 \end{bmatrix} = [L_1] \quad \text{Formula (7)}$$

where the local reconstruction parity block $L_1 = B_{11} * D1 + B_{12} * D2 + B_{13} * D3$.

The local reconstruction parity block may be used for recovering lost original data blocks in the local domain. In a case that original data block $D_1$ in local domain $F_1$ is lost, on the basis of the local coding matrix of local domain $F_1$ and unlost data blocks $D_2$ and $D_3$ in the domain, it is possible to recover the lost original data block $D_1$, namely $D_1 = (L1 - B_{12} * D_2 - B_{13} * D_3)/B_{11}$.

Since the local coding matrix of each local domain is determined on the basis of the global coding matrix, a derivation relationship is created between the global parity block generated on the basis of the global coding matrix and the local reconstruction parity block of each local domain generated on the basis of the local coding matrixes. The derivation relationship between the global parity block and the local reconstruction parity block of each local domain at step 106 is determined by the logic of determining the local coding matrix of each local domain on the basis of the global coding matrix at step 104.

As can be seen from the above description, in this specification, for a plurality of original data blocks for which parity blocks are to be generated, a global coding matrix thereof is first determined. After dividing the plurality of original data blocks to respective local domains, a local coding matrix of each local domain is determined respectively on the basis of the global coding matrix. Next, global parity blocks for the plurality of original data blocks are generated on the basis of the global coding matrix, and a local reconstruction parity block of each local domain is generated on the basis of the local coding matrix of each local domain, wherein the local coding matrix employed when generating the local reconstruction parity block of each local domain is determined on the basis of the global coding matrix, such that a derivation relationship is created between the local reconstruction parity blocks and the global parity blocks. On the basis of the derivation relationship, the recovery of a lost parity block may be realized by means of a parity block that is not lost, thereby reducing the traffic and time that are consumed for acquiring an original data block, optimizing the generation means of a parity block, and improving the data recovery efficiency.

In order to enable those skilled in the art to better understand the technical solutions in this specification, the foregoing content will be further described below in detail.

Figure 2:
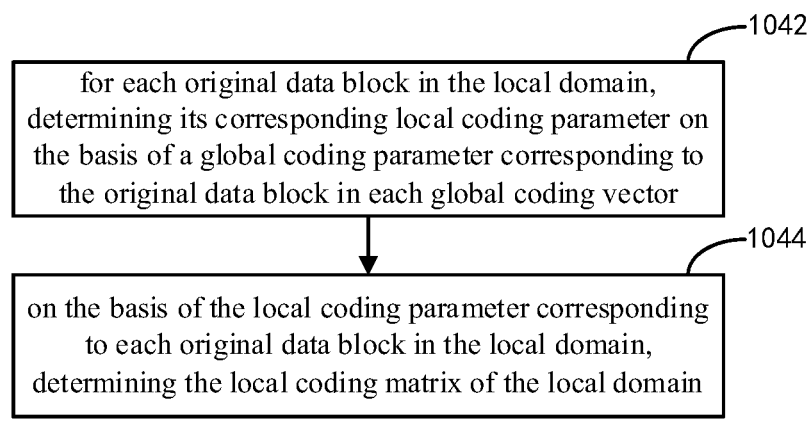
FIG. 2 is a schematic flow chart of a method for determining a local coding matrix as shown in an exemplary embodiment.

Please refer to FIG. 2. In an implementation, the step 104, for each local domain that is obtained by dividing the plurality of original data blocks, determining the local coding matrix of the local domain on the basis of the global coding matrix, wherein each local domain comprises original data blocks that belongs to the local domain, may comprise the following steps:

Step 1042: for each original data block in the local domain, determining a local coding parameter corresponding to the original data block on the basis of a global coding parameter corresponding to the original data block in each global coding vector of the global coding matrix, to obtain the local coding parameter corresponding to each original data block in the local domain.

Step 1044: determining, on the basis of the local coding parameter corresponding to each original data block in the local domain, the local coding matrix of the local domain.

Assuming that n local domains are obtained by division, for each local domain $F_q$ (q=1, 2, \ldots, n), it is possible to determine a local coding matrix of the local domain $F_q$. The local coding matrix comprises local coding parameters in one-to-one correspondence with respective original data blocks in the local domain $F_q$. For each original data block $D_j$ in the local domain $F_q$, on the basis of the global coding parameter $A_{ij}$ corresponding to the original data block $D_j$ in each global coding vector of the global coding matrix, it is possible to determine local coding parameters $B_{qj}$ corresponding to original data blocks in the local domain.

Taking local domain $F_1$ comprising original parity blocks $D_1$, $D_2$ and $D_3$ as an example, the local coding matrix of the local domain $F_1$ comprises local coding parameters $B_{11}$, $B_{12}$ and $B_{13}$ corresponding to original data blocks $D_1$, $D_2$ and $D_3$ on a one-to-one basis. On the basis of respective global coding parameters $A_{i1}$ (i=1, 2, . . . , m) corresponding to original data block $D_1$ in the global coding matrix, it is possible to determine local coding parameter $B_{11}$. On the basis of respective global coding parameters $A_{i2}$ (i=1, 2, . . . , m) corresponding to original data block $D_2$ in the global coding matrix, it is possible to determine local coding parameter $B_{12}$. On the basis of respective global coding parameters $A_{i3}$ (i=1, 2, . . . , m) corresponding to original data block $D_3$ in the global coding matrix, it is possible to determine local coding parameter $B_{13}$.

In an example, a local coding parameter corresponding to an original data block may be the sum of its corresponding global coding parameters, then $B_{11}=A_{11}+A_{21}+\ldots+A_{m1}$, $B_{12}=A_{12}+A_{22}+\ldots A_{m2}$, and $B_{13}=A_{13}+A_{23}+\ldots+A_{m3}$.

After determining the local coding parameter corresponding to each original data block in the local domain, the local coding matrix of the local domain may be determined on the basis of the local coding parameters. For example, the local coding matrix of the above local domain $F_1$ is $[A_{11}+A_{21}+\ldots+A_{m1}\ A_{12}+A_{22}+\ldots+A_{m2}\ A_{13}+A_{23}+\ldots+A_{m3}]$.

It may be understood that the logic of determining the local coding matrix of each local domain on the basis of the global coding matrix affects a derivation relationship between the global parity block and the local reconstruction parity block of each local domain. Based on the previous example, when a local coding parameter corresponding to an original data block in each local domain is the sum of its corresponding global coding parameters, a value by executing XOR operation for the global parity block generated on the basis of the global coding matrix at step 106 is consistent with a value by executing XOR operation for the local reconstruction parity block generated on the basis of the local coding matrix of each local domain:

$$\sum_{i=1}^{m} P_i = \sum_{i=1}^{m} \sum_{j=1}^{k} A_{ij} * D_j$$
$$= \sum_{q=1}^{n} L_q = \sum_{q=1}^{n} \sum_{r=1}^{r_{max}} B_{qr} * D_j = \sum_{j=1}^{k} \sum_{i=1}^{m} A_{ij} * D_j$$

Figure 3:
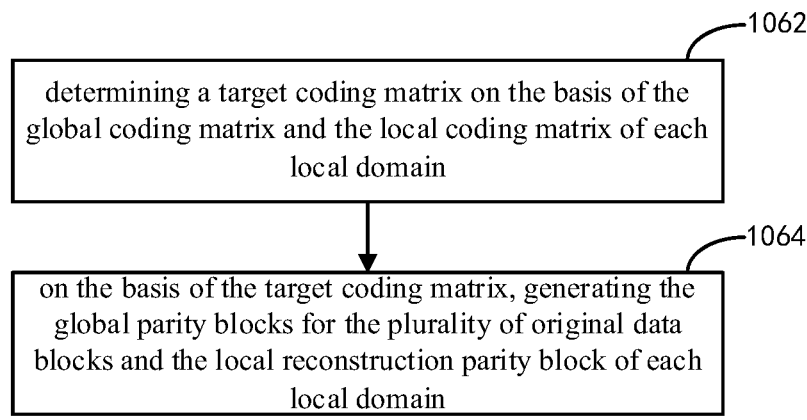
FIG. 3 is a schematic flow chart of a method for generating a global parity block and a local reconstruction parity block as shown in an exemplary embodiment.

Please refer to FIG. 3. In an optional implementation, the step 106, generating, on the basis of the global coding matrix, the global parity block for the plurality of original data blocks, and generating, on the basis of the local coding matrix of each local domain, the local reconstruction parity block of each local domain, may comprise the following steps:

Step 1062: determining a target coding matrix on the basis of the global coding matrix and the local coding matrix of each local domain.

After determining the global coding matrix and the local coding matrix of each local domain, a target coding matrix may be determined by combining the global coding matrix and the local coding matrix of each local domain. In an example, it is possible to perform zero padding for the local coding matrix of each local domain, and splice the local coding matrix of each local domain after zero padding with the global coding matrix to obtain the target coding matrix.

The target coding matrix comprises a plurality of target coding vectors in one-to-one correspondence with respective parity blocks, each target coding vector comprising target coding parameters in one-to-one correspondence with respective original data blocks.

The target coding vector corresponding to the global parity block may employ the global coding vector in the global coding matrix, and a target coding parameter in the target coding vector may be the global coding parameter in the global coding vector. The target coding vector corresponding to the local reconstruction parity block of each local domain may be determined based on the local coding matrix of the local domain, a target coding parameter in the target coding vector corresponding to an original data block in the local domain may be the local coding parameter in the local coding matrix, and the target coding parameter corresponding to the original data block outside the local domain may be 0.

Step 1064: generating, on the basis of the target coding matrix, the global parity blocks for the plurality of original data blocks and the local reconstruction parity block of each local domain.

Each parity block is generated on the basis of the determined target coding matrix, wherein each global parity block may be generated on the basis of each global coding vector in the target coding matrix, and the local reconstruction parity block of each local domain may be generated on the basis of the target encoding vector in the target coding matrix, which is determined by the local coding matrix of each local domain. It should be noted that the global parity block and the local reconstruction parity block of each local domain may be generated at one time based on the target coding matrix.

In this way, by combining the global coding matrix and the local coding matrix of each local domain into one target coding matrix, and on the basis of the target coding matrix, generation of the global parity block and the local reconstruction parity block of each local domain is completed. Compared with separate generation of the global parity block and each local reconstruction parity block on the basis of the global coding matrix and the local coding matrix of each local domain, the operation process is simplified and the efficiency of generating the parity blocks is improved.

In an example, the parity block generation method provided in this specification may further comprise a parity block recovery method.

In an implementation, the method further comprises a global parity block recovery method:

in a case that any global parity block is lost, recovering the lost global parity block on the basis of an unlost global parity block and the local reconstruction parity block of each local domain.

A means of recovering a global parity block depends on the logic employed when determining the local coding matrix of each local domain on the basis of the global coding matrix at step 106. Taking as an example a local coding parameter corresponding to an original data block in the local domain being the sum of its corresponding global coding parameters as mentioned above, a derivation relationship between global parity blocks $P_1, P_2, \ldots, P_m$ and local reconstruction parity blocks $L_1, L_2, \ldots, L_n$ of each local domain is $P_1+P_2+\ldots+P_m=L_1+L_2+\ldots+L_n$, and on the basis of unlost global parity blocks and the local reconstruction parity block of each local domain, any lost global parity block $P_i$ may be recovered, namely, $P_i=\Sigma_{q=1}^{n}L_q-\Sigma_{i'=1,i'\neq i}^{m}P_{i'}$.

In an implementation, the method further comprises a local reconstruction parity block recovery method:

in a case that any local reconstruction parity block is lost, recovering the lost local reconstruction parity block on the basis of the global parity blocks and unlost local reconstruction parity blocks of respective local domains.

A means of recovering a local reconstruction parity block depends on the logic employed when determining the local coding matrix of each local domain on the basis of the global coding matrix at step 106. Taking as an example a local coding parameter corresponding to an original data block in the local domain being the sum of its corresponding global coding parameters as mentioned above, a derivation relationship between global parity blocks $P_1, P_2, \ldots, P_m$ and local reconstruction parity blocks $L_1, L_2, \ldots, L_n$ of each local domain is $P_1+P_2+\ldots+P_m=L_1+L_2+\ldots+L_n$, and on the basis of unlost global parity blocks and the unlost local reconstruction parity blocks of respective local domains, any lost local reconstruction parity block $L_q$ may be recovered, namely $L_q = \Sigma_{i=1}^{m} P_i - \Sigma_{q'=1, q' \neq q}^{n} L_{q'}$.

Compared with related technologies, where all original data blocks need to be acquired when recovering a global parity block, and all original data blocks in a local domain need to be acquired when recovering a corresponding local reconstruction parity block, the parity block generation method provided in this specification may recover, just on the basis of unlost parity blocks, any lost global parity block or local reconstruction parity block, which reduces the traffic and time consumed, and improves the efficiency of data recovery. Furthermore, the larger the number of original data blocks for which parity blocks are to be generated, the more significant the effects.

In order to enable those skilled in the art to better understand the technical solutions in this specification, the parity block generation method provided in this specification will be explained in detail below with reference to a specific example.

For original data blocks $D_1, D_2, D_3, D_4, D_5$ and $D_6$ for which parity blocks are to be generated and the number of global parity blocks being set in advance to 2, a node device in a distributed system determines a global coding matrix for original data blocks $D_1, D_2, D_3, D_4, D_5$ and $D_6$ by employing the format of a Vandermonde matrix, shown as below:

$$\begin{bmatrix} 1 & 1 & 1 & 1 & 1 & 1 \\ 1 & 2 & 4 & 8 & 16 & 32 \end{bmatrix}$$

By dividing original data blocks $D_1, D_2, D_3, D_4, D_5$ and $D_6$, they are divided to two local domains, with a local domain $F_1$ including original data blocks $D_1, D_2$ and $D_3$, and a local domain $F_2$ including original data blocks $D_4, D_5$ and $D_6$.

For local domain $F_1$, its local coding matrix will be determined. Global coding parameters in the global coding matrix corresponding to original data block $D_1$ in the domain are 1, 1, it is determined that a local coding parameter $B_{11}$ corresponding to original data block $D_1$ is the sum of the two, namely 2. Global coding parameters in the global coding matrix corresponding to original data block $D_2$ in the domain are 1, 2, it is determined that its corresponding local coding parameter $B_{12}$ is 3. A local coding parameter $B_{13}$ corresponding to original data block $D_3$ in the domain is 5. Thus, it is determined that the local coding matrix of local domain $F_1$ is as below:

[2 3 5]

Similarly, a local coding matrix of local domain $F_2$ is determined as below:

[9 17 33]

Based on the above global coding matrix and the local coding matrix of each local domain, a target coding matrix is determined by means of zero padding and splicing. The target coding matrix comprises target coding vectors, the number of target coding vectors is consistent with the number of the parity blocks. Each target coding vector comprises target coding parameters, and the number of the target coding parameters in each target coding vector is consistent with the number of original data blocks. A target coding vector corresponding to the global parity block follows the global coding vector, and a target coding vector corresponding to the local reconstruction parity block is formed through zero padding on the basis of the local coding matrix of each local domain. The target coding matrix obtained by splicing the global coding matrixes with the local coding matrixes after zero padding is shown as below:

$$\begin{bmatrix} 1 & 1 & 1 & 1 & 1 & 1 \\ 1 & 2 & 4 & 8 & 16 & 32 \\ 2 & 3 & 5 & 0 & 0 & 0 \\ 0 & 0 & 0 & 9 & 17 & 33 \end{bmatrix}$$

Based on the target coding matrix, it is possible to generate global parity blocks $P_1$ and $P_2$ for original data blocks $D_1, D_2, D_3, D_4, D_5$ and $D_6$, as well as local reconstruction parity block $L_1$ of local domain $F_1$ and local reconstruction parity block $L_2$ of local domain $F_2$ as below:

$$\begin{bmatrix} 1 & 1 & 1 & 1 & 1 & 1 \\ 1 & 2 & 4 & 8 & 16 & 32 \\ 2 & 3 & 5 & 0 & 0 & 0 \\ 0 & 0 & 0 & 9 & 17 & 33 \end{bmatrix} * \begin{bmatrix} D_1 \\ D_2 \\ D_3 \\ D_4 \\ D_5 \\ D_6 \end{bmatrix} =$$

$$\begin{bmatrix} P_1 \\ P_2 \\ L_1 \\ L_2 \end{bmatrix} = \begin{bmatrix} D_1 + D_2 + D_3 + D_4 + D_5 + D_6 \\ D_1 + 2D_2 + 4D_3 + 8D_4 + 16D_5 + 32D_6 \\ 2D_1 + 3D_2 + 5D_3 \\ 9D_4 + 17D_5 + 33D_6 \end{bmatrix}$$

In a case that any global parity block or local reconstruction parity block is lost, on the basis of a derivation relationship of $P_1+P_2=L_1+L_2$, the lost global parity block or local reconstruction parity block may be recovered based on unlost parity blocks.

As can be seen from the above description, in this specification, for a plurality of original data blocks for which parity blocks are to be generated, a global coding matrix thereof is first determined. After dividing the plurality of original data blocks to respective local domains, a local coding matrix of each local domain is determined respectively on the basis of the global coding matrix. Next, global parity blocks for the plurality of original data blocks are generated on the basis of the global coding matrix, and a local reconstruction parity block of each local domain is generated on the basis of the local coding matrix of each local domain, wherein the local coding matrix employed when generating the local reconstruction parity block of each local domain is determined on the basis of the global coding matrix, such that a derivation relationship is created between the local reconstruction parity blocks and the global parity blocks. On the basis of the derivation relationship, the recovery of a lost parity block may be realized by means of a parity block that is not lost, thereby reducing the traffic and time that are consumed for acquiring an original data block, optimizing the generation means of a parity block, and improving the data recovery efficiency.

Figure 4:
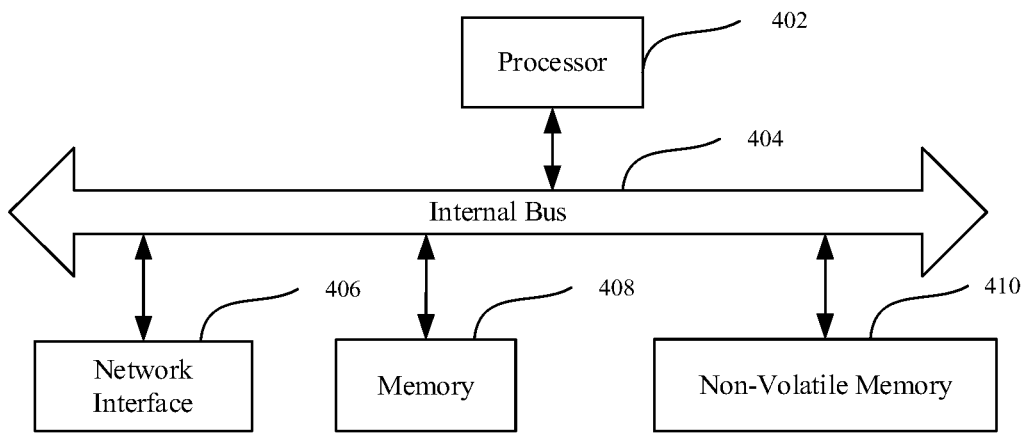
FIG. 4 is a structural schematic diagram of an electronic device with a parity block generation apparatus located therein provided in an exemplary embodiment.

FIG. 4 is a structural schematic diagram of an electronic device provided in an exemplary embodiment. Please refer to FIG. 4. At a hardware level, this device comprises a processor 402, an internal bus 404, a network interface 406, a memory 408 and a non-volatile memory 410. Surely, it may further comprise other hardware required by services. One or more embodiments of this specification may be implemented based on software. For example, processor 402 reads a corresponding computer program from non-volatile memory 410 into memory 408 and then runs it. Surely, in addition to the implementation with software, one or more embodiments of this specification do not exclude other implementations, such as a logic device or a combination of software and hardware, that is to say, the execution entity of the following processing flows is not limited to each logic unit, which may also be hardware or a logic device.

Figure 5:
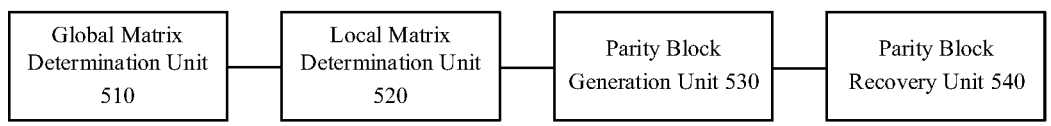
FIG. 5 is a block diagram of a parity block generation apparatus provided in an exemplary embodiment.

Please refer to FIG. 5. A parity block generation apparatus provided in this specification may be applied to the electronic device shown in FIG. 4 to implement the technical solutions of this specification. The parity block generation apparatus may comprise a global matrix determination unit 510, a local matrix determination unit 520, and a parity block generation unit 530, wherein global matrix determination unit 510 determines, for a plurality of original data blocks for which parity blocks are to be generated, a global coding matrix for the plurality of original data blocks; local matrix determination unit 520 determines, for each local domain that is obtained by dividing the plurality of original data blocks, a local coding matrix of the local domain on the basis of the global coding matrix, each local domain comprises original data blocks that belongs to the local domain; and parity block generation unit 530 generates, on the basis of the global coding matrix, global parity blocks for the plurality of original data blocks, and generates, on the basis of the local coding matrix of each local domain, a local reconstruction parity block of each local domain, such that the global parity blocks have a derivation relationship with the local reconstruction parity block of each local domain.

In an example, the global coding matrix comprises one or more global coding vectors, each global coding vector comprises global coding parameters in one-to-one correspondence with respective original data blocks. Local matrix determination unit 520, when determining, for each local domain that is obtained by dividing the plurality of original data blocks, the local coding matrix of the local domain on the basis of the global coding matrix, determines, for each original data block in the local domain and on the basis of a global coding parameter corresponding to the original data block in each global coding vector, a local coding parameter corresponding to the original data block, to obtain the local coding parameter corresponding to each original data block in the local domain; and determining, on the basis of the local coding parameter corresponding to each original data block in the local domain, the local coding matrix of the local domain.

In an example, parity block generation unit 530, when generating, on the basis of the global coding matrix, the global parity blocks for the plurality of original data blocks, and generating, on the basis of the local coding matrix of each local domain, the local reconstruction parity block of each local domain, determines a target coding matrix on the basis of the global coding matrix and the local coding matrix of each local domain; and generates, on the basis of the target coding matrix, the global parity blocks for the plurality of original data blocks and the local reconstruction parity block of each local domain.

In an example, the apparatus further comprises: a parity block recovery unit 540, which recovers, in a case that any global parity block is lost, the lost global parity block on the basis of an unlost global parity block and the local reconstruction parity block of each local domain.

In an example, the apparatus further comprises: a parity block recovery unit 540, which recovers, in a case that any local reconstruction parity block is lost, the lost local reconstruction parity block on the basis of the global parity blocks and unlost local reconstruction parity blocks of respective local domains.

The systems, apparatuses, modules or units expounded in the above embodiments may be specifically implemented by computer chips or entities, or by products with certain functions. A typical implementing device is a computer, a specific form of which may be a personal computer, a laptop, a cellular phone, a camera phone, a smart phone, a personal digital assistant, a media player, a navigation device, an email transceiver, a game controller, a tablet, a wearable device, or a combination of any several of these devices.

In a typical configuration, the computer comprises one or more processors (CPUs), input/output interfaces, network interfaces, and memory.

The memory may include a non-permanent storage such as a random access memory (RAM), and/or non-volatile memory forms such as a read-only memory (ROM) or a flash RAM, in computer-readable media. The memory is an example of computer-readable media.

The computer-readable media include both permanent and non-permanent, removable and non-removable media that may implement information storage by any method or technology. The information may be computer-readable instructions, data structures, modules of programs, or other data. Examples of computer storage media include, but are not limited to, a phase-change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a disk storage, a quantum memory, a graphene-based storage media, or other magnetic storage devices, or any other non-transmission media, which may be used to store information that may be accessed by a computing device. As defined herein, the computer-readable media do not include transitory computer-readable media, such as modulated data signals and carrier waves.

It should also be noted that terms "comprise", "include" or any other variants thereof are intended to cover a non-exclusive inclusion, such that a process, method, commodity, or device comprising a series of elements not only comprises these elements, but also comprises other elements not expressly listed, or elements inherent to such process, method, commodity or device. Without further limitation, an element defined by the statement "comprising a . . . " does not exclude the presence of additional identical elements in a process, method, commodity or device that comprises this element.

Described above are particular embodiments of this specification. Other embodiments are within the scope of the attached claims. In some cases, actions or steps recorded in the claims may be executed in a different order than in the embodiments, and may still achieve desired results. Additionally, processes depicted in the drawings do not necessarily require a particular or consecutive order to achieve desired results. In some implementations, multitasking and parallel processing are also possible or may be advantageous.

Terms used in one or more embodiments of this specification are only for the purpose of describing particular embodiments, and are not intended to limit one or more embodiments of this specification. Singular forms of "a/an", "the" and "this" used in one or more embodiments of this specification and the attached claims are also intended to include the plural forms, unless otherwise clearly indicated in the context. It should also be understood that the term "and/or" used herein refers to and includes any or all possible combinations of one or more associated items as listed.

It should be understood that although various information may be described employing terms such as first, second and third in one or more embodiments of this specification, such information should not be limited to these terms. These terms are only used for distinguishing information of the same type from each other. For example, without departing from the scope of one or more embodiments of this specification, the "first information" may also be referred to as "second information", and similarly, "second information" may also be referred to as "first information". Depending on the context, the word "if" used here may be interpreted as "when" or "as" or "to determine . . . in response to . . . "

Described above are merely preferred embodiments of one or more embodiments of this specification, which are not intended to limit one or more embodiments of this specification. Any modifications, equivalent replacements, improvements, or the like made within the spirit and principles of one or more embodiments of this specification should be included within the scope of protection of one or more embodiments of this specification.

What is claimed is:

1. A parity block generation method, implemented by any node device in a distributed system, comprising:
   determining a global coding matrix for a plurality of original data blocks stored in the distributed system;
   obtaining each local domain by dividing the plurality of original data blocks, and determining a local coding matrix of the local domain based on the global coding matrix, wherein each local domain comprises original data blocks that belong to the local domain; and
   generating, based on the global coding matrix, global parity blocks for the plurality of original data blocks, and generating, based on the local coding matrix of each local domain, a local reconstruction parity block of each local domain, wherein the global parity blocks have a derivation relationship with the local reconstruction parity block of each local domain.

2. The method according to claim 1, wherein the global coding matrix comprises one or more global coding vectors, each global coding vector comprises global coding parameters in one-to-one correspondence with respective original data blocks; and
   for each local domain, the determining the local coding matrix of the local domain based on the global coding matrix comprises:
   for each original data block in the local domain, determining, based on a global coding parameter corresponding to the original data block in each global coding vector, a local coding parameter corresponding to the original data block, to obtain the local coding parameter corresponding to each original data block in the local domain; and
   determining, based on the local coding parameter corresponding to each original data block in the local domain, the local coding matrix of the local domain.

3. The method according to claim 1, wherein the generating, based on the global coding matrix, the global parity blocks for the plurality of original data blocks, and the generating, based on the local coding matrix of each local domain, the local reconstruction parity block of each local domain comprises:
   determining a target coding matrix based on the global coding matrix and the local coding matrix of each local domain; and
   generating, based on the target coding matrix, the global parity blocks for the plurality of original data blocks and the local reconstruction parity block of each local domain.

4. The method according to claim 1, further comprising:
   in a case that any global parity block is lost, recovering the lost global parity block based on an unlost global parity block and the local reconstruction parity block of each local domain.

5. The method according to claim 1, further comprising:
   in a case that any local reconstruction parity block is lost, recovering the lost local reconstruction parity block based on the global parity blocks and unlost local reconstruction parity blocks of respective local domains.

6. An electronic device, comprising:
   a processor; and
   a memory for storing processor-executable instructions;
   wherein the processor runs the executable instructions to perform operations of:
      determining a global coding matrix for a plurality of original data blocks stored in a distributed system;
      obtaining each local domain by dividing the plurality of original data blocks, and determining a local coding matrix of the local domain based on the global coding matrix, wherein each local domain comprises original data blocks that belong to the local domain; and
      generating, based on the global coding matrix, global parity blocks for the plurality of original data blocks, and generating, based on the local coding matrix of each local domain, a local reconstruction parity block of each local domain, wherein the global parity blocks have a derivation relationship with the local reconstruction parity block of each local domain.

7. The electronic device according to claim 6, wherein the global coding matrix comprises one or more global coding vectors, each global coding vector comprises global coding parameters in one-to-one correspondence with respective original data blocks; and
   wherein the processor runs the executable instructions to perform further operations of:
   for each original data block in the local domain, determining, based on a global coding parameter corresponding to the original data block in each global coding vector, a local coding parameter corresponding to the original data block, to obtain the local coding parameter corresponding to each original data block in the local domain; and determining, based on the local coding parameter corresponding to each original data block in the local domain, the local coding matrix of the local domain.

8. The electronic device according to claim 6, wherein the processor runs the executable instructions to perform further operations of:
determining a target coding matrix based on the global coding matrix and the local coding matrix of each local domain; and
generating, based on the target coding matrix, the global parity blocks for the plurality of original data blocks and the local reconstruction parity block of each local domain.

9. The electronic device according to claim 6, wherein the processor runs the executable instructions to perform further operations of:
in a case that any global parity block is lost, recovering the lost global parity block based on an unlost global parity block and the local reconstruction parity block of each local domain.

10. The electronic device according to claim 6, wherein the processor runs the executable instructions to perform further operations of:
in a case that any local reconstruction parity block is lost, recovering the lost local reconstruction parity block based on the global parity blocks and unlost local reconstruction parity blocks of respective local domains.

11. A non-transitory computer-readable storage medium, storing a computer program therein, wherein the computer program, when executed by a processor, implements operations of:
determining a global coding matrix for a plurality of original data blocks stored in a distributed system;
obtaining each local domain by dividing the plurality of original data blocks, and determining a local coding matrix of the local domain based on the global coding matrix, wherein each local domain comprises original data blocks that belong to the local domain; and
generating, based on the global coding matrix, global parity blocks for the plurality of original data blocks, and generating, based on the local coding matrix of each local domain, a local reconstruction parity block of each local domain, wherein the global parity blocks have a derivation relationship with the local reconstruction parity block of each local domain.

12. The non-transitory computer-readable storage medium according to claim 11, wherein the global coding matrix comprises one or more global coding vectors, each global coding vector comprises global coding parameters in one-to-one correspondence with respective original data blocks; and
wherein the computer program, when executed by the processor, implements further operations of:
for each original data block in the local domain, determining, based on a global coding parameter corresponding to the original data block in each global coding vector, a local coding parameter corresponding to the original data block, to obtain the local coding parameter corresponding to each original data block in the local domain; and
determining, based on the local coding parameter corresponding to each original data block in the local domain, the local coding matrix of the local domain.

13. The non-transitory computer-readable storage medium according to claim 11, wherein the computer program, when executed by the processor, implements further operations of:
determining a target coding matrix based on the global coding matrix and the local coding matrix of each local domain; and
generating, based on the target coding matrix, the global parity blocks for the plurality of original data blocks and the local reconstruction parity block of each local domain.

14. The non-transitory computer-readable storage medium according to claim 11, wherein the computer program, when executed by the processor, implements further operations of:
in a case that any global parity block is lost, recovering the lost global parity block based on an unlost global parity block and the local reconstruction parity block of each local domain.

15. The non-transitory computer-readable storage medium according to claim 11, wherein the computer program, when executed by the processor, implements further operations of:
in a case that any local reconstruction parity block is lost, recovering the lost local reconstruction parity block based on the global parity blocks and unlost local reconstruction parity blocks of respective local domains.

* * * * *